July 4, 1939.  R. L. WAGNER  2,164,972
BLOWPIPE
Filed June 26, 1937  2 Sheets-Sheet 1
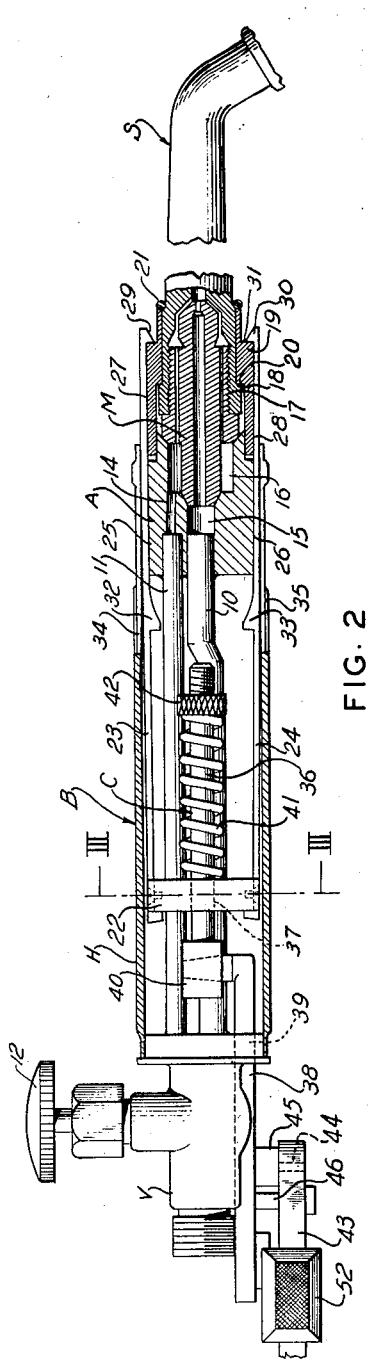
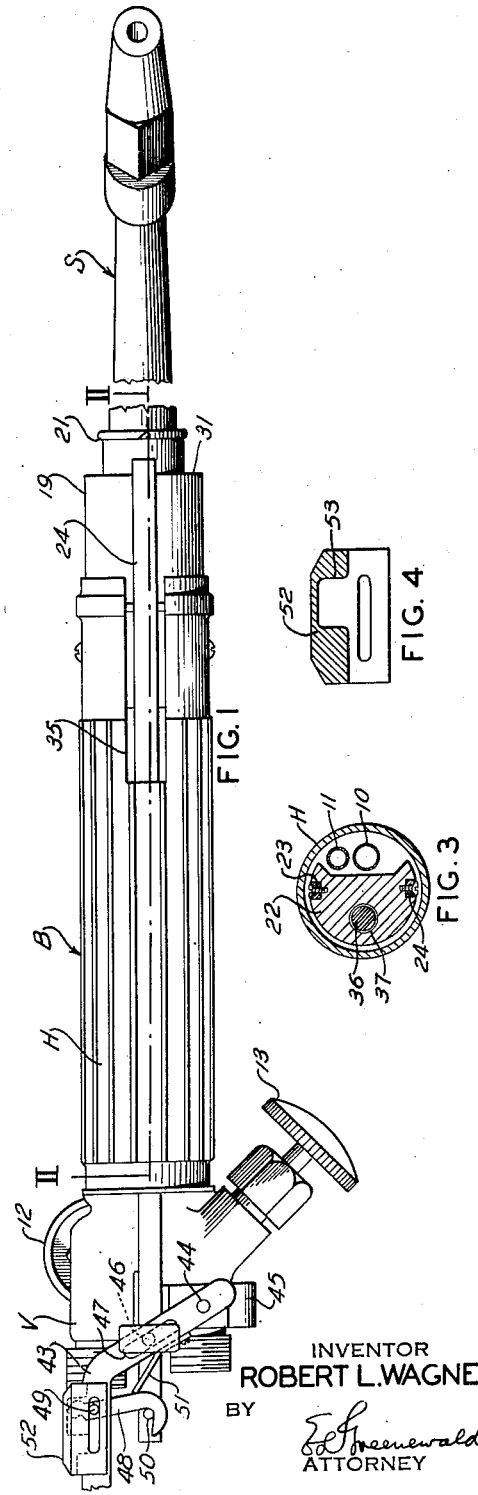
INVENTOR
ROBERT L. WAGNER
BY
E L Greenewald
ATTORNEY

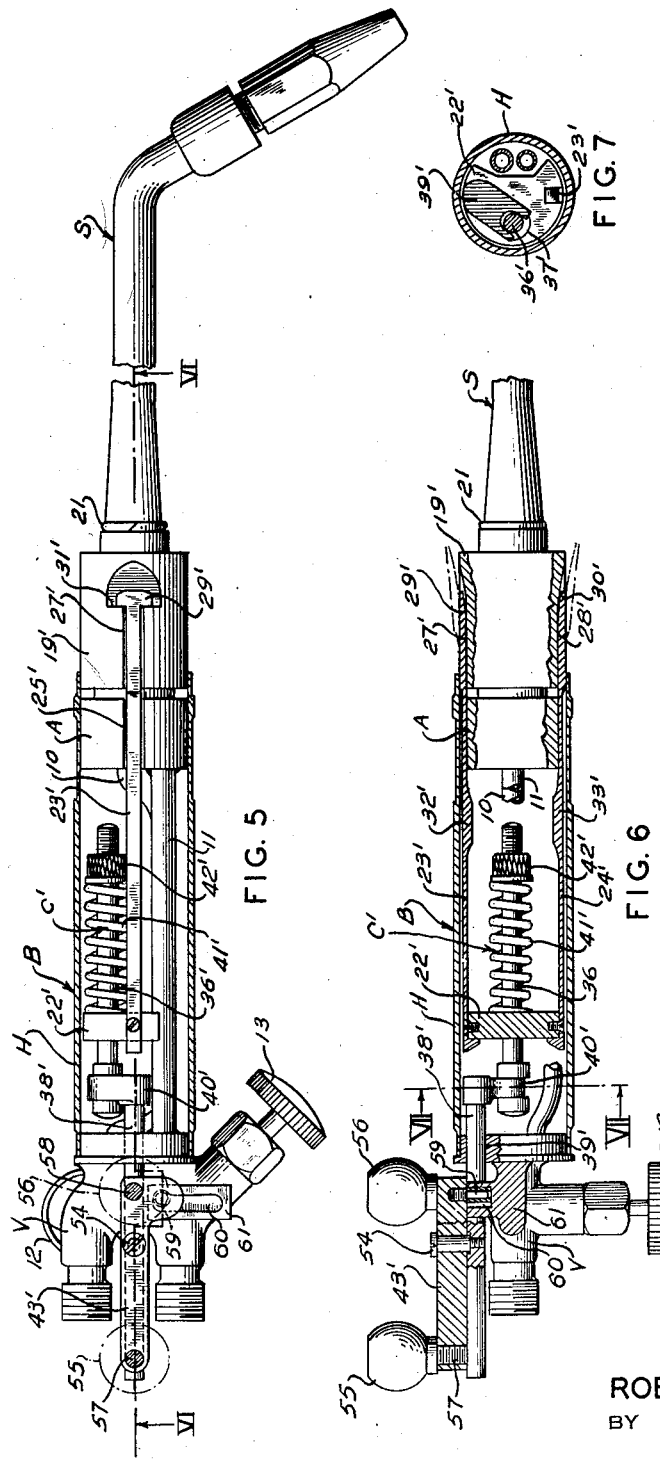

Patented July 4, 1939

2,164,972

UNITED STATES PATENT OFFICE 2,164,972

BLOWPIPE

Robert L. Wagner, Niagara Falls, N. Y., assignor to Oxweld Acetylene Company, a corporation of West Virginia Application June 26, 1937, Serial No. 150,530

19 Claims. (Cl. 158—27.4)

This invention relates to a blowpipe, and more particularly to means for connecting a stem, tip, nozzle, or the like, to a blowpipe body. The invention is especially useful in connection with a welding blowpipe, to which use, however, it is not limited.

In the art of applying heat by means of a blowpipe it is general practice to employ a single blowpipe for doing different grades of work. To this end, it is usual to provide a series of stems, tips, nozzles, or the like, having varying gas capacities, and all similarly formed at one end for attachment to the blowpipe. (For convenience, the word "stem" will be used herein to designate all such elements.) Heretofore, such stems have been connected to the blowpipe by means of a threaded connection, either directly between the stem and the blowpipe or between a stem-attaching nut and the blowpipe. However, such threads become worn or damaged, and after considerable use they cannot be depended upon to hold the stem in place with a sure, tight fit. Furthermore, attachment by means of threaded connections requires time and constitutes an unproductive operation.

One object of the invention is, therefore, to provide means for attaching a stem to a blowpipe body without employing a threaded connection. Another object is the provision of such means in a form which will not become unduly worn or damaged after continued use. A further object is the provision of such means in a form which will permit quick and certain attachment or detachment of the stem when it is necessary to apply or remove it.

The above and other objects and novel features of the invention will be apparent from the following description taken with the accompanying drawings, in which:

Fig. 1 is a broken longitudinal elevation of a blowpipe embodying the invention;

Fig. 2 is a broken elevation of the blowpipe illustrated in Fig. 1, shown partly in section on the line II—II of Fig. 1;

Fig. 3 is a cross-section of the blowpipe taken on the line III—III of Fig. 2;

Fig. 4 is a longitudinal mid-section through an element of the blowpipe which is illustrated in Figs. 1 and 2;

Fig. 5 is a broken longitudinal elevation, partly in section, of a blowpipe illustrating another form of the invention;

Fig. 6 is a longitudinal section taken on the line VI—VI of Fig. 5; and

Fig. 7 is a cross-section taken on the line VII—VII of Fig. 6.

A blowpipe embodying the present invention comprises a body B; a gas mixer M for mixing a combustion-supporting gas such as oxygen, and a fuel gas such as acetylene, which pass through conduits in the body to the mixer; and a stem S which receives the gas mixture and delivers the same to produce the heating flame. A clamping device C connects the stem to the body, with the mixer held firmly in operative position between the body and the stem. The clamping device is preferably flexible and its operating connection is preferably resilient, in order that the clamp may spread outwardly to receive the stem, and in order that the tightening mechanism may be moved into a position of rest and stability while still holding the body, the stem and the mixer firmly and operatively in contact with one another.

The blowpipe body B comprises a tubular handle H having a valve block V connected at its rear end; a head block A connected at its forward end; and oxygen and acetylene conduits 10 and 11, respectively, extending therethrough between the valve block and the head block. Valves 12 and 13 in the valve block control the passage of oxygen and acetylene, respectively, through the blowpipe. Passages 14 and 15 extend from the forward ends of the conduits 10 and 11, respectively, through the head block A to a cavity 16 in which the mixer M is located, at the forward end thereof. The passages 14 and 15 open into the cavity 16 in appropriate locations to supply the respective gases to the mixer M, in well-known manner.

In the embodiment here illustrated, the mixer M is held in the rear end of the stem S by means of a threaded connection 17, in order that the mixer and the stem may be attached and detached as a unit. Clearly, the threads may be omitted and the mixer may be held in place simply by being pressed between the stem and the head block when they are drawn tightly together.

Provision is made for turning the stem about the common axis of the stem and the blowpipe after the stem has been connected. Thus, the rear end of the stem is formed with an external annular shoulder 18 thereon; and a cylindrical connecting block 19, having an internal annular shoulder 20 thereon, surrounds the rear end of the stem, projecting rearwardly thereof with its annular shoulder 20 in contact with the shoulder 18 of the stem. The stem may thus be turned with respect to the connecting block 19. A split ring 21 is snapped into an external groove (not shown) in the stem, and prevents axial movement of the connecting block with respect to the stem.

It will, accordingly, be evident that a force applied axially of the blowpipe to the connecting block 19 will exert a similar force upon the stem S. Such a force is exerted by the clamping device C which will now be described. The stem clamping device comprises, broadly, a clamp for gripping the stem, a lever for operating the clamp, and resilient means connecting the clamp to the lever.

As here shown, the clamp comprises a yoke 22 disposed transversely within the blowpipe handle H and movable axially thereof, together with two stem-gripping elements 23 and 24 rigidly connected at their rear ends to opposite sides of the yoke. Thus forward or rearward movement of the stem-gripping elements necessarily accompanies like movement of the yoke 22. The stem-gripping elements 23 and 24 extend forwardly of the yoke 22 within the blowpipe handle, and thence through channels 25 and 26 respectively in the head block A and continuing channels 27 and 28 in the connecting block 19. They terminate in inwardly-turned hooked ends 29 and 30 respectively, whereby they may engage an external shoulder 31 of the connecting block 19. Because they lie in the channels 25 and 26 in the head block, and the continuing channels 27 and 28 in the connecting block, the stem-gripping elements do not project beyond the circumferential surface of the blowpipe where they extend forwardly of the handle H. Clearly, the connecting block 19 might be omitted, and the stem itself might be formed to provide an external shoulder for engagement by the hooked ends 29 and 30.

From the foregoing, it will be apparent that when the hooked ends of the stem-gripping elements engage the shoulder 31 of the connecting block 19, a force exerted rearwardly of the blowpipe upon the yoke 22 will press the stem S and the mixer M firmly into operative connection with the head block A of the blowpipe.

In order that the clamping device may receive or release the stem, it is necessary that the hooked ends 29 and 30 of the stem-gripping elements 23 and 24 be moved forwardly and spread outwardly. The former movement may be effected simply by moving forwardly of the blowpipe within the handle H the yoke 22 to which these two elements are rigidly attached. The hooked ends of the stem-gripping elements are spread apart simultaneously with their forward movement. Accordingly, the stem-gripping elements 23 and 24 are made of flexible resilient material, and have inwardly extending cams 32 and 33, respectively, formed thereon behind and adjacent to the head block A. As the clamping device is advanced, the cams 32 and 33 ride over the rear end of the head block A, thereby bending the flexible stem-gripping elements and spreading their hooked ends 29 and 30 as they are moved forwardly. Oppositely disposed slots 34 and 35 in the forward end of the handle H permit the stem-gripping elements 23 and 24, respectively, to bend outwardly behind the cams 32 and 33 as they ride up over the head block A. With the hooked ends 29 and 30 spread apart, the stem may be applied to or removed from the blowpipe.

With the stem applied to the blowpipe the clamping device is moved rearwardly of the handle H. The cams 32 and 33 thereupon move out of contact with the head block A and the resiliency of the stem-gripping elements 23 and 24 returns the hooked ends 29 and 30 to their original stem-gripping position. It may be desirable to construct the handle so that its edges at the bases of the slots 34 and 35 will contact the stem-gripping elements as the cams 32 and 33 are withdrawn from the head block A. Thus sliding contact with the handle may assist the resiliency of these elments in returning them to stem-gripping position.

The resilient operating connection of the clamping device C acts upon the yoke 22 to move the device forwardly or rearwardly as desired, and to retain the device resiliently in rearward position with the stem held firmly in place. As here shown, this connection comprises rod means projecting loosely through the yoke 22 and through the end of the handle adjacent the valve block V. The rod means comprises a rod 36 which extends loosely through an opening 37 in the yoke 22 in a direction parallel to the blowpipe axis, together with a second rod 38 parallel thereto, extending through the handle adjacent the valve block, as at 39, and connected to the first rod by a coupling 40. A spring or coil 41 surrounds the rod 36 and is compressed between the forward face of the yoke 22 and a knurled nut 42 threaded on the forward end of the rod 36.

From the foregoing, it must be evident that, when the rod 38 is moved forwardly from the position which is illustrated in Fig. 2, the rod 36 will move forwardly through the yoke 22 until the coupling 40 contacts the rear face of the yoke 22. Further forward movement of the rod 38 will cause the coupling 40 to move the yoke 22 forwardly, thereby advancing the clamp and spreading the hooked ends 29 and 30 of the stem-gripping elements 23 and 24 in the manner which has already been explained. Rearward movement of the rod 38 compresses the coil spring 41 disposed substantially longitudinally of the blowpipe body B, which exerts rearward pressure upon the yoke 22, thereby moving the clamp rearwardly and drawing the hooked ends 29 and 30 toward one another. After the hooked ends have contacted the shoulder 31 and the clamp has drawn the stem tightly into place, the rod means may be drawn slightly further back because of the resiliency of the spring 41. This increases the resilient pressure between the stem and the head block.

It may be here noted that the compression of the spring 41 may be adjusted by turning the knurled nut 42. It may be further noted that since the pressure exerted between the stem and the head block is resilient, it is possible to pull the stem slightly away from the head block against the resiliency of the spring 41 and in this position to turn the stem in the connecting block without disconnecting the stem from the head block. Upon releasing the pull on the stem, the spring 41 will return the stem to its original position axially of the blowpipe.

The means for moving the rod 38 forwardly and rearwardly of the blowpipe is illustrated in Figs. 1 and 2 as a lever 43 which is pivoted, as at 44, to a collar 45 attached to the valve block B. Obviously, the lever 43 might be pivoted directly to the valve block. A pin 46 projects radially from the rod 38 into a slot 47 in the lever 43. Turning of the lever 43 about its pivot 44 therefore imparts axial movement to the rod 38 by sliding contact between the lever and the pin 46. Thus, clockwise movement of the lever about its pivot will move the rod 38 forwardly of the blowpipe; whereas contraclockwise movement of the lever 43 will give the rod motion rearwardly of the blowpipe.

According to the present invention, means is provided for holding the clamping device and its operating mechanism in stem-engaging position. Accordingly, a latch 48 is pivoted, as at 49, to the lever 43, and engages a pin 50 extending radially from the rod 38. When the mechanism is in stem-engaging position, the lever 43 is thus prevented from turning in a clockwise direction and effecting release of the stem. A leaf spring 51 is welded or otherwise attached to the lever 43 and bears resiliently against the latch 48 to hold it in engagement with the pin 50.

A thumb slide 52, mounted upon the lever 43 above the latch 48, serves to release the latch from contact with the pin 50, in order that the stem S may be disengaged from the head block A. The disengaging operation is started by bearing down with the thumb upon the roughened upper surface of the thumb slide 52. This turns the lever 43 slightly in a contraclockwise direction, against the resistance of the spring 41. The same movement pushes the latch 48 downwardly out of contact with the pin 50. The thumb slide 52 is now displaced rearwardly along the lever 43, and thus bears with an inner face 53 upon the latch 48 above the pivot 49. The latch is thus turned in contraclockwise direction against the pressure of the spring 51 until it completely clears the pin 50. The lever may now be turned in a clockwise direction about its pivot 44, and thereby move the rod 38 forwardly of the blowpipe, releasing the stem in the manner already described.

The form of the invention which is illustrated in Figs. 5, 6, and 7 is similar in principle to that which has already been described. Here, however, oppositely disposed notches, formed externally in the connecting block 19' at the forward ends of the longitudinal channels 27' and 28', provide inwardly projecting shoulders 31' extending at right angles to the channels. The forward ends of the stem-gripping elements 23' and 24' are not hooked, but extend laterally on either side of the element to provide heads 29' and 30' for engaging the shoulders 31'.

The clamping device C' of the present embodiment is otherwise similar to that previously described, and operates in exactly the same manner. Thus, forward movement of the yoke 22' moves the stem-gripping elements 23' and 24' forwardly, and causes cams 32' and 33' respectively formed thereon to ride over the rear end of the head block A. The heads 29' are thus separated, releasing the stem. Rearward motion of the yoke 22' causes the cams 32' and 33' to move out of contact with the head block A, whereupon the resiliency of the stem-gripping elements causes them to draw together and the heads 29' and 30' to engage the shoulders 31'.

The resilient operating connection of the clamping device C' comprises a rod 36' which extends loosely through an opening 37' in the yoke 22'. It also comprises a second rod 38' parallel to the rod 36' which extends through the blowpipe handle adjacent the valve block V, as at 39'. The two rods are connected rearwardly of the yoke 22' by a coupling 40'. A coil spring 41' surrounds the rod 36', and is compressed between the forward space of the yoke 22' and a knurled nut 42' threaded on the forward end of the rod 36', the coil being disposed so that its axis is substantially parallel with the axis of the body B.

Movement of the rod 38' will obviously operate this clamping device exactly as movement of the rod 38 operates the clamping device C which has previously been described.

In the embodiment which is illustrated in Figs. 5, 6, and 7, the rod 38' is moved forwardly and rearwardly of the blowpipe by means of a lever 43' which is pivoted upon a screw 54 threaded into the rod 38' and extending radially therefrom. Balls 55 and 56 swiveled upon stems 57 and 58, respectively, threaded into the ends of the lever 43', provide convenient means for turning the lever about the screw 54. A pin 59 is screwed into one end of the lever 43' and extends rigidly therefrom into a slot 60 lying substantially at right angles to the blowpipe axis in a lug 61 which is cast on the valve block V. Thus, turning the lever 43' in a clockwise direction from the position illustrated in Fig. 5 will displace the pin 59 outwardly in the slot 60. As the lever is turned, pressure between the pin 59 and the rear wall of the slot 60 will effect forward movement of the rod 38'. Turning the lever 43' in a contraclockwise direction until it assumes the position illustrated in Fig. 5, will move the rod 38' rearwardly of the blowpipe through pressure exerted by the pin 59 on the forward wall of the slot 60. Clearly, the first movement will release the stem and the second movement will clamp the stem to the head block A, both in a manner which has already been described.

A slight forward turn at the inner end of the slot 60, into which the pin 59 may move, provides for retaining the parts in stem-engaging position. Thus, as the rod 38' is moved to its extreme rearward position and the pin 59 reaches the forward turn in the slot 60, the spring 41' moves the rod 38' slightly forward and causes the pin to enter the forward turn in the slot. It is thereafter necessary to apply an appreciable turning force to the lever 43' in order to move the pin 59 from the forward turn in the slot 60 against the force with which the spring holds it there. It is here noted that because of the resiliency of the spring 41', there is no tendency for the clamping device to move when the pin 59 enters the forward turn in the slot.

Clearly, the resiliency of the springs 41 or 41' act or assist to maintain the clamping means in each embodiment in firm engagement with the connecting block, with the stem drawn tightly against the head block A. Furthermore, resiliency of the springs 41 and 41', and the adjustability of the force which they exert will compensate for any wear in the engaging part.

From the foregoing, it will be apparent that the present invention provides means for attaching a stem to a blowpipe body without the use of a threaded connection, and in such form that the connecting elements will not become unduly worn or damaged after continued use. It will be further apparent that the means disclosed permits quick and certain attachment or detachment of the stem when it is necessary to apply or remove it.

The forms of the invention here described and illustrated in the accompanying drawings are disclosed merely to indicate how the invention may be applied. Other forms, differing in detail but not in principle from those here shown and described, will, of course, suggest themselves to those skilled in the art. For example, more than two stem-engaging elements may be provided. Furthermore, the rods 36 and 38 are not necessarily formed as separate parts. Also means other than the collar 40 might be employed to bear against the rear face of the yoke 22 in order to move the clamping device forwardly.

I claim:

1. In a blowpipe, a blowpipe body, a blowpipe stem, and resilient means carried by said body for engaging said stem, and a spring associated with said means for longitudinally clamping said stem to said body, said spring comprising a coil disposed so that its axis is substantially parallel with the axis of said stem.

2. In a blowpipe, a body, a valve block at the rear end of said body, a head block at the forward end of said body, a stem, and mechanism associated with said valve block and extending ahead of said head block for gripping said stem and clamping the stem to said head block.

3. In a blowpipe, a body; a valve block at the rear end of said body; a head block at the forward end of said body; a stem, and mechanism for gripping said stem and clamping the stem to said head block; said mechanism comprising an operating lever pivoted to said valve block, resilient connecting means in said body attached to said operating lever, and stem-engaging means attached to said connecting means and extending forwardly of said head block.

4. A blowpipe body, a stem, a clamp for holding said stem in operative engagement with said body, and means including a lever pivoted to said blowpipe body for operating said clamp, and self adjusting means including a spring connecting said lever and said clamp for exerting pressure between said stem and body.

5. A blowpipe body, a stem, a clamp for holding said stem in operative engagement with said body, and means including a lever pivoted to said blowpipe body for operating said clamp, lost motion means including a spring connecting said lever and said clamp for holding said stem in contact with said body, and means for locking said lever in place with said clamp holding the stem in operative engagement with said body.

6. A blowpipe comprising a body, a stem, and a mixing element, in combination with resilient means comprising a coil spring disposed longitudinally of and carried by said body for clamping said stem to said body with said mixing element held firmly under longitudinal compression in operative position between said body and said stem.

7. A blowpipe comprising a handle, a valve block at the rear end of said handle, a head block at the forward end of said handle, a mixing element, a stem, and mechanism associated with said valve block and extending ahead of said head block for gripping said stem and clamping the stem to said head block with said mixing element held firmly in operative position between said head block and the stem.

8. A blowpipe comprising a handle; a valve block at the rear end of said handle; a head block at the forward end of said handle; a mixing element; a stem, and mechanism for gripping said stem and clamping the stem to said head block; said mechanism comprising an operating lever pivoted to said valve block, resilient connecting means in said handle attached to said operating lever, and stem-engaging means attached to said connecting means and extending forwardly of said head block for clamping the stem to said head block with said mixing element held firmly in operative position between said head block and the stem.

9. A blowpipe having a stem and a head block, of means for clamping said stem to said head block, said means comprising a rod, a lever pivoted to the blowpipe for moving said rod longitudinally of said blowpipe, stem-gripping means held for movement longitudinally of the blowpipe, resilient means connecting said stem-gripping means with said rod, and means responsive to such longitudinal movement for operating said stem-gripping means.

10. A blowpipe having a stem and a head block, of means for clamping said stem to said head block, said means comprising a rod substantially parallel to the axis of the blowpipe, a lever pivoted to the blowpipe for moving said rod longitudinally of the blowpipe, stem-gripping means extending forwardly of the blowpipe head block and held for movement longitudinally of the blowpipe, resilient means connecting said stem-gripping means with said rod, and means acting to operate said stem-gripping means in accordance with the longitudinal movement thereof.

11. A blowpipe having a stem and a head block, of means for clamping said stem to said head block, said means comprising a rod within the blowpipe substantially parallel to the axis of the blowpipe, a lever pivoted to the rear of the blowpipe for moving said rod substantially axially thereof, flexible stem-gripping means extending forwardly of the blowpipe head block and held for movement longitudinally of the blowpipe, resilient means including a spring connecting said stem-gripping means with said rod, and means operated by such longitudinal movement for opening and closing said stem-gripping means.

12. A blowpipe having a stem and a head block, of means for clamping said stem to said blowpipe head block, said means comprising an elongated flexible stem-gripping element extending longitudinally of the blowpipe and having a stem-engaging projection thereon, cam means associated with said block and said element for operating the latter when said element is moved forwardly and rearwardly of the blowpipe, and means for moving said element forwardly and rearwardly of the blowpipe.

13. A blowpipe having a stem and a head block, of means for clamping said stem to said blowpipe head block, said means comprising an elongated flexible stem-gripping element extending longitudinally of the blowpipe and having a stem-engaging projection thereon, means for displacing the forward end of said element radially of the blowpipe when said element is moved forwardly and rearwardly thereof, and means for moving said element forwardly and rearwardly of the blowpipe.

14. A blowpipe having a stem and a head block, of means for clamping said stem to said blowpipe head block, said means comprising an elongated flexible stem-gripping element extending longitudinally of the blowpipe and having a stem-engaging projection thereon, a cam formed on said element adapted to coact with a part of the blowpipe for displacing the forward end of said element radially of the blowpipe when said element is moved forwardly and rearwardly thereof, and means for moving said element forwardly and rearwardly of the blowpipe.

15. A blowpipe comprising a tubular handle, a head block fastened to the forward end of said handle, a valve block fastened to the rear end of said handle, a yoke within said handle, a stem, two stem-gripping elements connected at their rear ends to opposite sides of said yoke within the blowpipe handle and extending forwardly ahead of said head block through channels therein, rod means projecting loosely through said yoke and through the end of said handle adjacent said valve block, a lever pivoted to said valve block and connected to said rod means for reciprocating the latter longitudinally of the blowpipe, and a spring between said yoke and said rod means forming a resilient connection therebetween, said stem-gripping elements having stem-engaging projections on their forward ends, the arrangement being such that the force of said spring is transmitted to provide longitudinal compression between said stem and head block.

16. A blowpipe comprising a tubular handle, a head block fastened to the forward end of said handle, a valve block fastened to the rear end of said handle, a yoke within said handle, two flexible stem-gripping elements connected at their rear ends to opposite sides of said yoke within the blowpipe handle and extending forwardly ahead of said head block through channels therein, rod means projecting loosely through said yoke and through the end of said handle adjacent said valve block, a lever pivoted to said valve block and connected to said rod means for reciprocating the latter longitudinally of the blowpipe, and an adjustable spring between said yoke and said rod means forming a resilient connection therebetween, said stem-gripping elements having stem-engaging projections on their forward ends and cam means thereon for making contact with said head block to spread said elements and admit the stem therebetween when said elements are pushed forward, substantially as described.

17. In a blowpipe, a body, a stem, resilient means carried by said body for engaging said stem, said resilient means tending through their resiliency to move inwardly to engage with the stem, means for moving said resilient members longitudinally of the body, means for forcing said resilient members apart during motion in one direction, and means for locking said resilient members in position in engagement with the stem at the extremity of movement in the opposite direction.

18. In a blowpipe, a body, a stem, stem-engaging means for gripping said stem when said stem-engaging means is moved longitudinally of said body, said stem being provided with means to be engaged by said stem-engaging means, means operatively connected to said stem-engaging means for moving the same longitudinally of the body, a lever operatively connected to said moving means and said body, and a latch carried by said lever for engaging said moving means.

19. A blowpipe comprising a stem, a tubular handle, a head block fastened to the forward end of said handle, a yoke within said handle, two flexible stem-gripping elements connected at their rear ends to opposite sides of said yoke within the blowpipe handle and extending forwardly ahead of said head block, rod means projecting loosely through said yoke, and an adjustable spring between said yoke and said rod means forming a resilient connection therebetween, said stem-gripping elements having stem-engaging projections on their forward ends and cam means thereon for making contact with said head block to spread said elements and admit the stem therebetween when said elements are moved forward, the arrangement being such that said stem is held normally in operative association with said head block by the force of said spring acting through said yoke and stem-gripping elements.

ROBERT L. WAGNER.